United States Patent [19]
Mikami

[11] Patent Number: 4,906,047
[45] Date of Patent: Mar. 6, 1990

[54] VEHICULAR SEAT

[76] Inventor: Tatuya Mikami, 2-13-20, Suehiro, Ichikawa-shi, Chiba-ken, Japan

[21] Appl. No.: 231,396

[22] Filed: Aug. 12, 1988

[30] Foreign Application Priority Data

Nov. 4, 1987 [JP] Japan .................. 62-277388

[51] Int. Cl.$^4$ ............................. A47C 31/00
[52] U.S. Cl. .................. 297/464; 297/486; 297/466
[58] Field of Search ............ 297/486, 466, 464, 284

[56] References Cited

U.S. PATENT DOCUMENTS

| | | | |
|---|---|---|---|
| 2,136,852 | 11/1958 | Knauth | 297/486 |
| 3,173,722 | 3/1965 | Carbonetti | 297/466 |
| 3,203,733 | 8/1965 | Priest et al. | 297/486 |
| 3,218,103 | 11/1965 | Boyce | 297/466 |
| 3,262,716 | 7/1966 | Graham | 297/486 |
| 3,466,091 | 9/1969 | De Grusso | 297/486 |
| 3,713,694 | 1/1973 | Miller | 297/486 |
| 3,764,180 | 10/1973 | Mulholland | 297/486 |
| 4,593,929 | 6/1986 | Williams | 297/466 |
| 4,652,053 | 3/1987 | Mikami . | |
| 4,732,423 | 3/1988 | Condon | 297/284 |

FOREIGN PATENT DOCUMENTS

61-36529  2/1986  Japan .
215449   7/1988  Japan .................. 297/486

Primary Examiner—Francis K. Zugel
Attorney, Agent, or Firm—Nixon & Vanderhye

[57] ABSTRACT

A vehicular seat according to the present invention, which has a seat section and a seat back section connected thereto, comprises a pair of lower horizontal arms, attached to the lower portion of the seat back section and having lower support means for supporting the hipbone region of a user's body, and a pair of upper horizontal arms, protruding from the top of the seat back section and having upper support means for supporting the bladebone regions of the user's body. The lower horizontal arms are fixed after the space between them is transversely adjusted to the size of the user's body. The upper horizontal arms, which are adjustable in height relative to the lower horizontal arms, are fixed after they are transversely moved in association with the lower horizontal arms.

12 Claims, 7 Drawing Sheets

VEHICULAR SEAT

BACKGROUND OF THE INVENTION

1. Field of the Invention

The present invention relates to a vehicular seat.

2. Description of the Related Art

Conventionally, vehicular seats for automobiles, airplanes, etc. are provided with guards for the upper half of the user's body. These guards are intended mainly to prevent the user from receiving impulsive force on his abdominal region or chest and to prevent the user from falling forward.

Despite the use of these guards, however, the impulsive force will probably damage the soft regions of the user's body, such as the digestive and respiratory organs. Moreover, the user is not at all protected against impacts other than longitudinal ones, i.e., the user is not protected against vertical and lateral impacts.

SUMMARY OF THE INVENTION

The present invention is intended to provide a vehicular seat free from the aforementioned drawbacks to permit safe traveling.

A first object of the invention is to provide a vehicular seat in which the upper half of the user's body is supported by support means at the hipbone and bladebone regions of the body, so that the digestive and respiratory organs cannot be damaged by the seat.

A second object of the invention is to provide a vehicular seat in which the support means are fixed so as to fit the user's body, whereby the body is protected against vertical and lateral impacts as well as longitudinal ones.

A further object of the invention is to provide a vehicular seat in which an impulsive force is transmitted to the user's body through a shock absorber, thus ensuring improved safety.

In order to achieve the above objects, a vehicular seat according to the present invention is constructed as follows.

A vehicular seat, which has a seat section and a seat back section connected thereto, comprises a pair of lower horizontal arms attached to the lower portion of the seat back section so as to be swingable within a horizontal plane, the lower horizontal arms each having, at the distal end portion thereof, lower support means for supporting the hipbone region of a user's body, and a pair of upper horizontal arms protruding from the top of the seat back section so as to be swingable within a horizontal plane, the upper horizontal arms each having, at the distal end portion thereof, upper support means for supporting the bladebone regions of the user's body, the respective proximal end portions of the lower horizontal arms being transversely movable inside the seat back section, and the upper horizontal arms being transversely movable in association with the lower horizontal arms and adjustable in height relative to the lower horizontal arms.

The lower and upper horizontal arms are fixed in position after they are transversely moved and swung to fit the user's body.

DETAILED DESCRIPTION OF THE PREFERRED EMBODIMENTS

Figure 1:
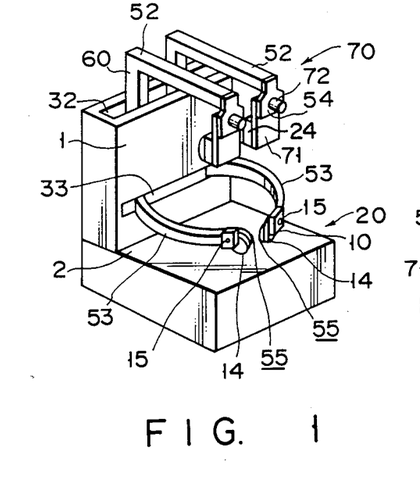
FIG. 1 is a perspective view showing a vehicular seat according to a first embodiment of the present invention.

FIG. 1 shows a vehicular seat in which seat back section 1, in the form of a rectangular tube, is connected to seat section 2. A pair of lower horizontal arms 53 are attached to the lower portion of back section 1 so as to be swingable and movable from side to side. Arms 53 serve to support the hipbone region of a user's body. Lower support means 20 is connected to the extreme end of each arm 53. A pair of upper horizontal arms 52 project from upper opening 32 of back section 1, and extend horizontally. Arms 52 serve to support the bladebone regions of the body. Upper support means 70 is connected to the extreme end of each arm 52. Upper arms 52, which are associated with lower arms 53 by means of coupling means (mentioned later), are movable from side to side, and also rockable. Further, the height of arms 52 above arms 53 is adjustable.

Figure 2:
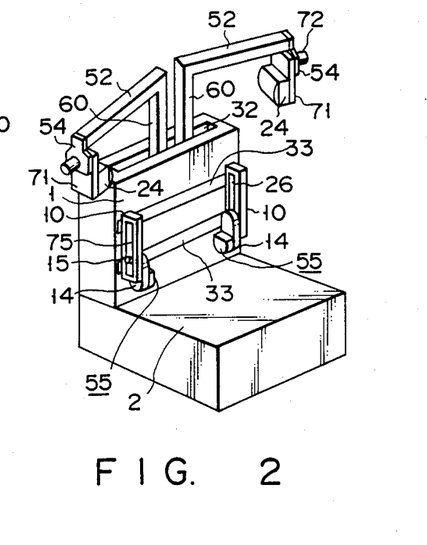
FIG. 2 is a perspective view showing a modification of the vehicular seat of FIG. 1.
Figure 3:
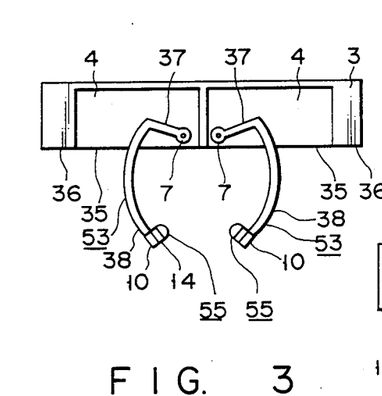
FIGS. 3 and 4 are diagrams corresponding to FIGS. 1 and 2, respectively, in which lower horizontal arms are swung forward from holders, and in which the lower horizontal arms are contained in the holders, respectively.
Figure 4:
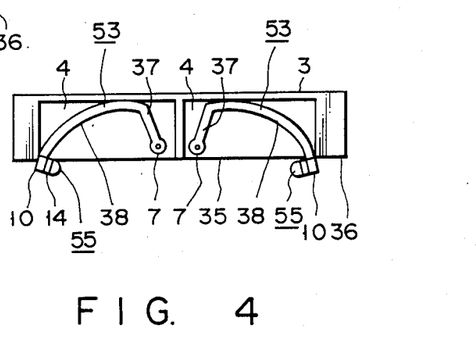
Figure 5:
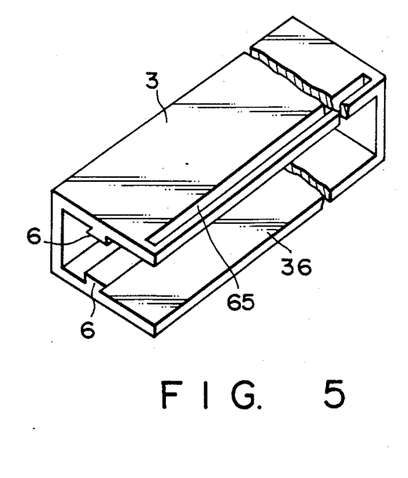
FIGS. 5 and 6 are perspective views showing a slide guide portion and a holder, respectively.
Figure 6:
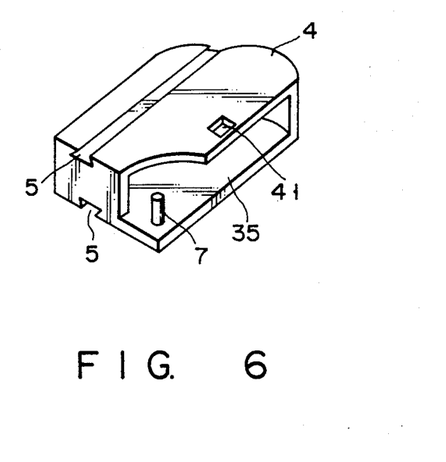
Figure 7:
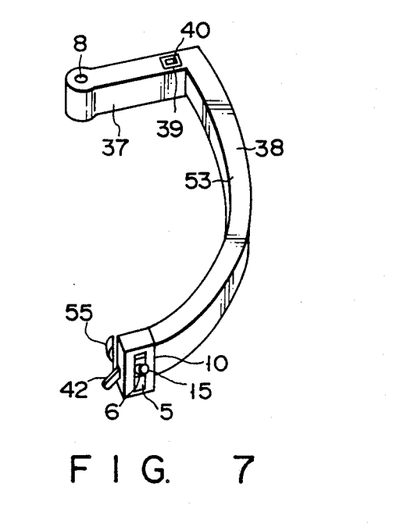
FIG. 7 is a perspective view of the lower horizontal arm fitted with a lower support frame.
Figure 8:
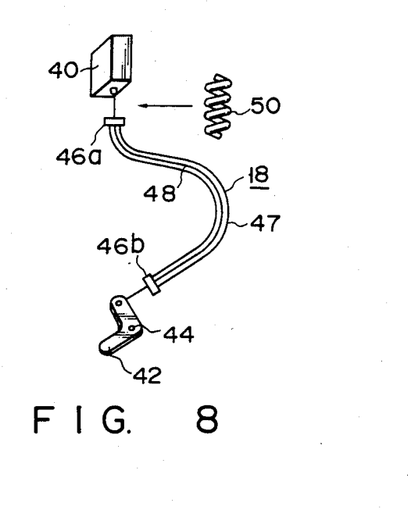
FIG. 8 is a diagram for illustrating fixing means.
Figure 10:
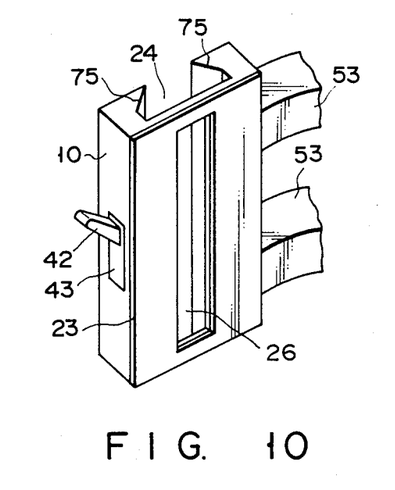
FIG. 10 is a perspective view of the lower support frame.

Opening 33 is bored through the lower front face of seat back section 3. Slide guide portion 3 with a U-shaped cross section is fixed facing this opening. As shown in FIG. 5 (illustrating only the right-hand side of portion 3), guide portion 3 has opening 36. A pair of dovetail ridges 6 are formed individually on the upper and lower inside surfaces of guide portion 3. Holders 4 with a U-shaped cross section, as shown in FIG. 6, are fitted in guide portion 3 for crosswise sliding action. A pair of dovetail grooves 5 are formed individually on the upper and lower inside surfaces of each holder 4. Slide slit 65 is bored through the top wall of slide guide portion 3. Base shaft 34 (mentioned later) protruding from the top wall of holder 4 is guided along slit 65. Pivot pin 7 for pivotally supporting each lower horizontal arm 53 is disposed inside opening 35 of each corresponding holder 4. As shown in FIG. 7, each lower arm 53 is composed of straight portion 37 and hollow curved portion 38 connected to each other. Hole 8 is bored through the proximal end portion of straight portion 37. Pin 7 is adapted to be fitted in hole 8. Lower support frame 10 (mentioned later) is connected to the distal end portion of curved portion 38. Thus, lower horizontal arm 53 can be fitted in holder 4, as shown in FIG. 4. As shown in FIG. 8, fixing means 18, which is adapted to be contained in each lower arm 53, includes pipe 47 having fixing portions 46a and 46b at the two opposite ends thereof, wire 48 passed through pipe 47, lever 42 connected to one end of wire 48, piece 40 connected to the other end wire 48, and compression spring 50 interposed between piece 40 and fixing portion 46a. A friction portion is formed on the top face of piece 40. Piece 40 and spring 50 are housed in retaining hole 39 (FIG. 7) formed in straight portion 37, and fixing portion 46a is fixed at the lower portion of hole 39. Pipe 47 and wire 48, which is connected to piece 40, are passed through curved portion 38, and fixing portion 46b is fixed inside lower support frame 10. The other end of wire 48 is connected to one end of lever 42, which is pivotally mounted on shaft 44 fixed to frame 10. As shown in FIG. 10, the other end of lever 42 projects from lever aperture 43 of frame 10. Gate hole 41 (FIG. 6) for piece 40 is bored through the top wall of holder 4. When lower horizontal arm 53 is swung to its working position, as shown in FIG. 3, holes 39 and 41 align with each other, so that piece 40 projects from hole 41 and is pressed against the underside of the top wall of slide guide portion 3 to be fixed thereby. In this case, a friction portion is also formed on the lower surface of the top wall of guide portion 3, so that the position of arm 53 can be securely fixed. FIGS. 2 and 4 show a state in which upper and lower horizontal arms 52 and 53 of FIGS. 1 and 3 are swung open.

Figure 11:
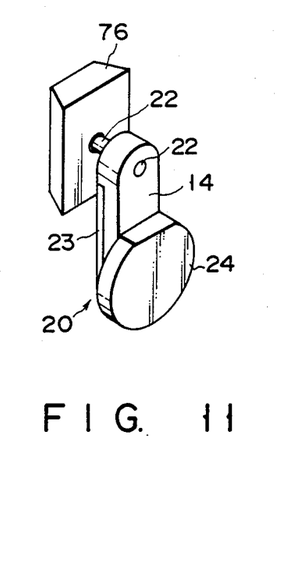
FIGS. 11 and 12 are perspective views showing a slider and other components surrounding the same.

Referring now to FIGS. 9 to 13, lower support means 20 will be described in detail. It is composed of lower support frame 10 attached to the distal end portion of lower horizontal arm 53, slider 14 guided for vertical motion by frame 10, space adjuster 55 attached to slider 14, and bumper 24 attached to adjuster 55. In this example, slider 14 is also swingable. In FIG. 11, space adjuster 55 is omitted.

Figure 12:
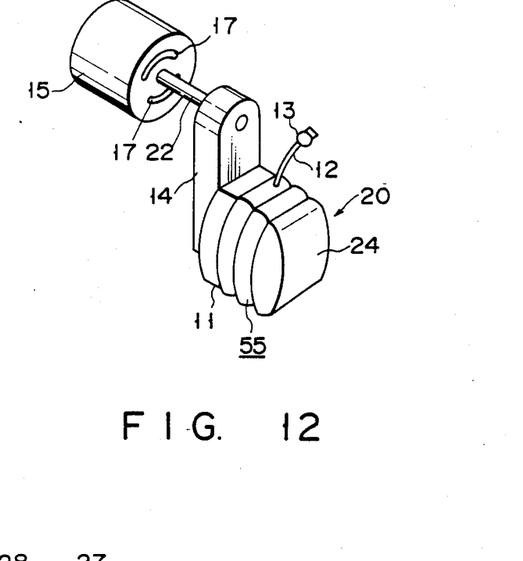
Figure 13:
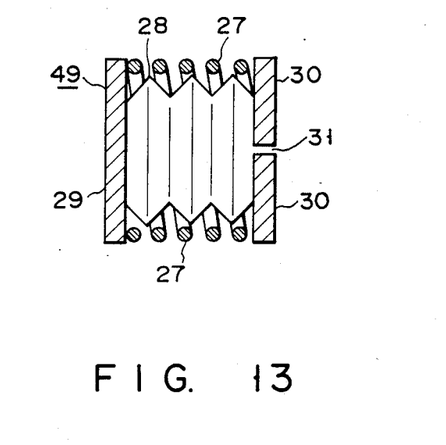
FIG. 13 is a longitudinal sectional view of a shock absorber.

Lower support frame 10, which is in the form of a rectangular block, has dovetail groove 75 on one side thereof, friction member 23 on the other side surface, and a slot 26 in the center, as shown in FIG. 10. Support frame 10 of FIG. 10 is fitted with a pair of lower horizontal arms 53 arranged vertically, as in the case of the arrangement shown in FIG. 2. Shaft 22, which is to be passed through slot 26, protrudes from one end of slider 14 which is in the form of a plate. Cylindrical knob 15 is fixed to an end of shaft 22. Another friction member 23 is attached to that surface of slider 14 from which shaft 22 protrudes. Disk 19 is contained in knob 15, and three legs 19a are arranged at regular intervals of 120° on the disk. As shown in FIG. 12, two arcuate slots are bored in the bottom face of knob 15. Dovetail projection 76, which is adapted to engage dovetail groove 75, is coupled to disk 19 by means of two connecting shafts 16 which penetrate slots 17, individually. Compression spring 21 is provided between knob 15 and support frame 10. Meanwhile, air bag 11, for use as spacer adjuster 55, and bumper 24 are arranged on the other end side of slider 14. Air tube 12 with hand pump 13 is connected to air bag 11 so that the amount of air can be adjusted by means of tube 12. In this case, shock absorber 49, which functions to damp impulsive compressive force, may be interposed between slider 14 and adjuster 55, as shown in FIG. 13. In absorber 49, bellows 28 is disposed between fixed plate 29 and vent plate 30 having vent hole 31 in the center, and is bonded thereto at either end. Bellows 28 is surrounded by compression spring 27 which is fixed, at either end thereof, to plates 29 and 30.

Figure 9:
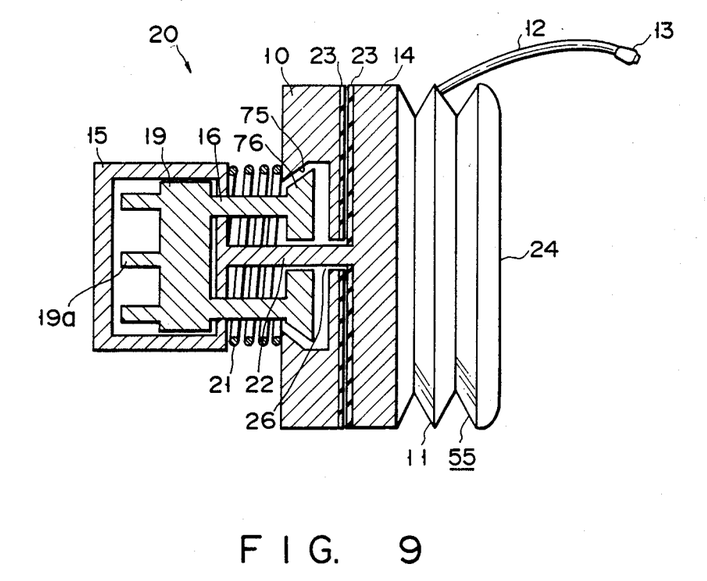
FIG. 9 is a cross-sectional view of lower support means.

With this arrangement, slider 14 is normally pressed against support frame 10 so that it is prevented from moving by friction members 23 which face each other, as shown in FIG. 9. When knob 15 is depressed against the urging force of compression spring 21 so that friction members 23 are disengaged from each other, slider 14 is allowed to move up and down, whereby space adjuster 55 and bumper 24 can be brought to their desired positions. In this example, adjuster 55 and bumper 24 can be rotated within a range of about 180° around shaft 22 by turning knob 15. Thus, the positions of adjuster 55 and bumper 24 can be adjusted over a wide angular range.

Referring now to FIGS. 14 to 19, the connection between upper horizontal arms 52 and holder 4 fitted with lower horizontal arms 53 will be described.

Figure 14:
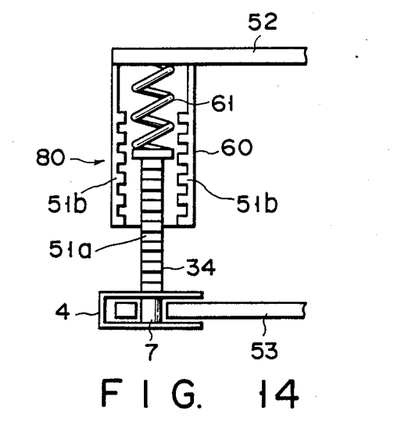
FIGS. 14 and 15 and FIGS. 16 and 17 are diagrams for illustrating an open state and a connected state, respectively, of coupling means.
Figure 15:
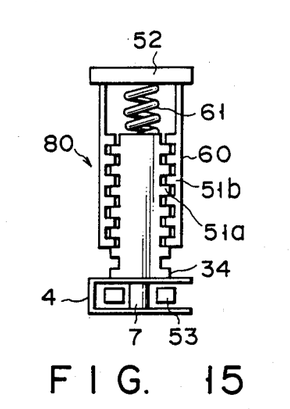
Figure 18:
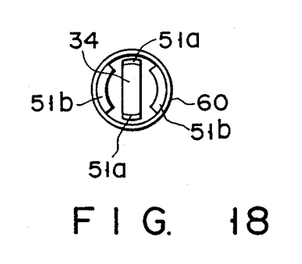
FIGS. 18 and 19 are cross-sectional views illustrating the open and connected states of the coupling means shown in FIGS. 14 to 17.
Figure 19:
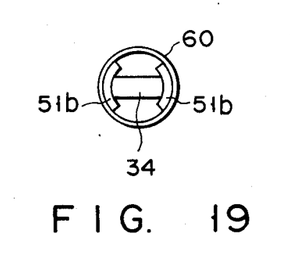

In FIGS. 14 and 15, cylindrical support shaft 60 protrudes downward from upper horizontal arm 52, and base shaft 34, which is adapted to be fitted in shaft 60, protrudes upward from holder 4. An internal thread formed on the inner surface of shaft 60 is axially cut off for opposite angular ranges of 90°, thus constituting female screws 51b as one component of coupling means 80. Base shaft 34 is in the form of a plate which is obtained by cutting off two opposite sides of a round rod having an external thread mating with female screws 51b. Thus, male screws 51a, which constitute the other component of coupling means 80, are formed individually on the two opposite edge portions of shaft 34. Compression spring 61 is interposed between shaft 34 and upper horizontal arm 52. In the state of FIG. 14 in which upper arm 52 is laterally swung open, screws 51a and 51b are disengaged, as shown in FIG. 18, so that arm 52 is forced up by spring 61. In use, arm 52 is depressed from this position to a desired height, against the urging force of spring 61 and swung forward. Thereupon, screws 51a and 51b engage one another, as shown in FIG. 19, thereby adjusting arm 52 to the desired height, as shown in FIG. 15. Upper horizontal arm 52 can also be fixed in a predetermined angular position by fixing means similar to fixing means 18.

Figure 16:
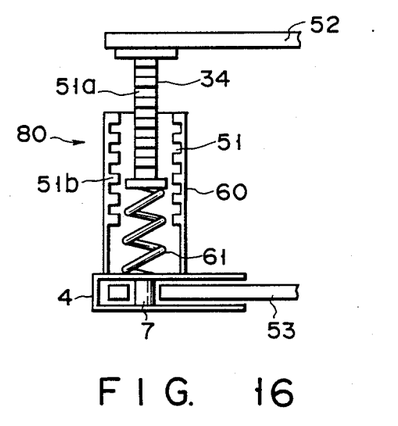
Figure 17:
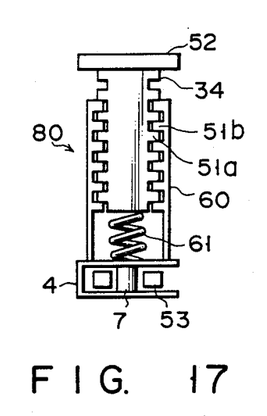

The same effect can be obtained if the configurations of base shaft 34 and support shaft 60 may be replaced with each other so that compression spring 61 is interposed between shaft 60 and holder 4, as shown in FIGS. 16 and 17.

Lower horizontal arm 53 extends transversely in FIGS. 14 and 16, while it extends longitudinally in FIGS. 15 and 17. Arms 53 can swing independently of upper horizontal arms 52.

Figure 20:
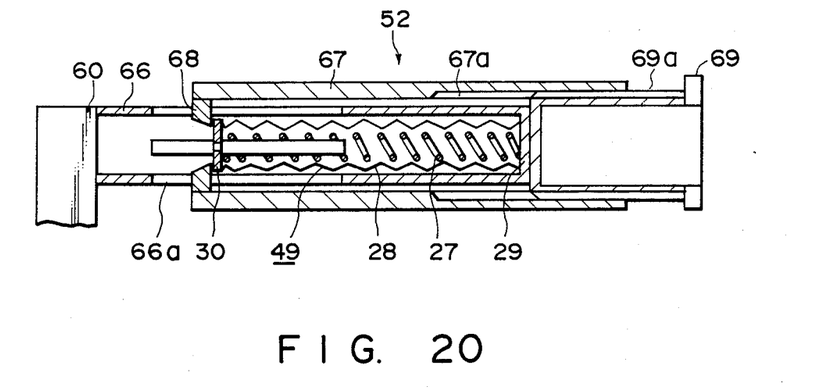
FIG. 20 is a longitudinal sectional view of an upper horizontal arm.

Referring now to FIG. 20, the construction of upper horizontal arm 52 will be described. Arm 52 is composed of inner cylinder 66 connected to support shaft 60, outer cylinder 67 slidably fitted in cylinder 66, and screw member 69 for use as space adjuster 55. Screw member 69 serves to adjust the position of cylinder 67 relative to cylinder 66, that is, to adjust the space between support shaft 60 and support means attached to cylinder 67. Shock absorber 49 is contained in inner cylinder 66. It has the same construction as the one mentioned before, except that compression spring 27 is disposed inside bellows 28. A plurality of axial slits 66a are cut in the peripheral surface of cylinder 66. A plurality of claws 68 protrudes inward from one end portion of outer cylinder 67 so that they abut against vent plate 30 of shock absorber 49 through slits 66a. Female screw 67a is provided at the other end side of cylinder 67. Screw member 69 has male screw 69a which mates with screw 67a. The end face of member 69 abuts against the end of inner cylinder 66. Thus, the space between support shaft 60 and upper support means 70 can be adjusted to the size of the user's body by turning screw member 69.

Figure 21:
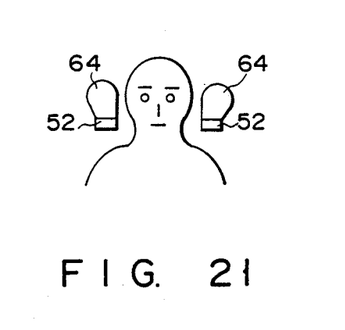
FIG. 21 is a diagram showing upper horizontal arms fitted individually with side headrests.
Figure 22:
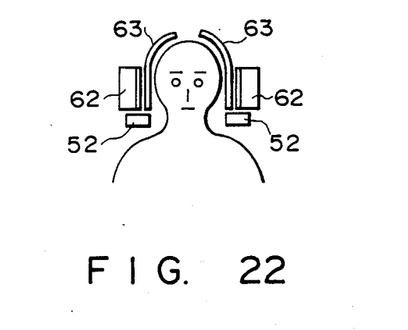
FIGS. 22 and 23 are a front view and a plan view, respectively, showing upper horizontal arms fitted with a helmet.
Figure 23:
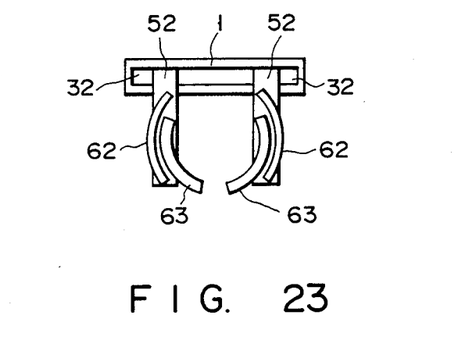

Referring now to FIGS. 1 and 2, upper support means 70 will be described in detail. It includes upper support member 54, rocker 71 rockably mounted thereon, and bumper 24 attached to the lower end portion of the rocker. A shaft is attached to the upper end portion of rocker 71 so as to penetrate support member 54, and knob 72 is fixed to this shaft. Rocker 71 can be rotated within a range of about 180°, with respect to member 54, through the medium of a rotating mechanism similar to the one shown in FIG. 9, by operating knob 72, and can thus be fixed in position. As head support means 81, side headrests 64 may be mounted on the top of upper horizontal arms 52, as shown in FIG. 21. Alternatively, a helmet composed of fixed portions 62 and rocking portions 63, as shown in FIGS. 22 and 23, or an integral helmet may be provided as support means 81.

As shown in FIG. 2, moreover, two sets of slide guide portions 3 and lower horizontal arms 53 are arranged at the lower portion of seat back section 1 so that one lower support frame 10 is attached to the respective distal end portions of each vertical pair of arms 53. Also in this case, each lower horizontal arm 53 can be fixed in a predetermined angular position by fixing means similar to fixing means 18.

The user sits on seat section 2 and brings his back close to seat back section 1. In this state, lower horizontal arms 53 are swung forward, and the space between them is adjusted, as shown in FIGS. 1 and 3. Thereafter, levers 42 of arm fixing means 18 are operated to fix lower arms 53. Then, knobs 15 of lower support means 20 are operated to adjust the vertical positions of sliders 14. Also, the amount of air in air bags 11, for use as space adjusters 55, is adjusted so that the user's hipbone region can be supported by means of arms 53.

Subsequently, in the state of FIG. 2 where upper horizontal arms 52 are parted right and left, arms 52 are forced down to a desired height, and then swung forward. Thus, arms 52 are positioned with respect to elevation, and then fixed. Thereafter, screw members 69, for use as space adjusters 55, are operated, and knobs 72 are operated so that the user's bladebone regions can be supported by means of bumpers 24.

Thus, even when the user meets with a head-on collision, his body is supported by the bladebone and hipbone regions, so that the soft regions of the body, such as the abdominal region and the breast, cannot be subjected to any impact. Since the individual arms are fixed, moreover, the body is protected against rolling and other impacts, mainly by upper and lower horizontal arms 52 and 53. Also, the impacts on the user's body can be damped by the action of shock absorbers 49 attached individually to upper and lower horizontal arms 52, 53. Furthermore, head support means 81 on upper horizontal arms 52 serves to protect the user's neck.

Figure 24:
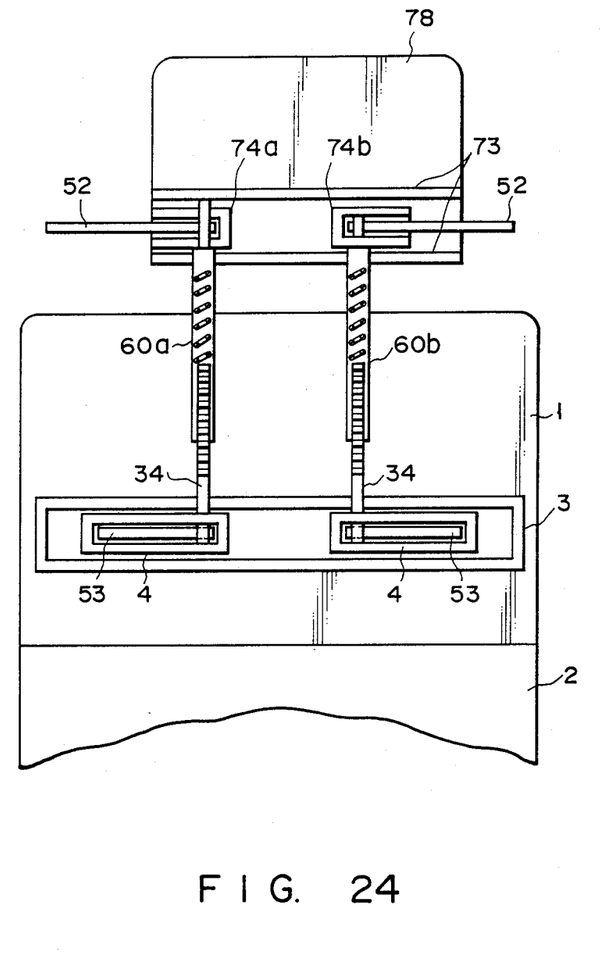
FIG. 24 is a diagram for illustrating a vehicular seat according to another embodiment of the present invention.

Referring now to FIG. 24, another embodiment of the present invention will be described.

In this embodiment, rear headrest 78 is provided above seat back section 1. Slide guide portion 73 similar to slide guide portion 3 is disposed under headrest 78, and holders 74a and 74b similar to holders 4 are arranged inside guide portion 73. Left-hand holder 74a is fixed to guide portion 73 and coupled with left-hand support shaft 60a. On the other hand, right-hand holder 74b is connected to right-hand support shaft 60b so that it can transversely slide together with shaft 60b inside guide portion 73. Thus, headrest 78 and holder 74b can transversely move together with left- and righthand support shafts 60a and 60b, respectively. Also, the position of headrest 78 can be adjusted to the vertical position of the user's head. With respect to other components, including upper and lower horizontal arms 52 and 53 and upper and lower support means 70 and 20, the second embodiment is constructed in the same manner as the first embodiment.

The second embodiment can produce the same effects as the first embodiment.

What is claimed is:

1. A vehicular seat which has a seat section and a seat back section connected thereto, comprising:
   a pair of lower horizontal arms attached to the lower portion of the seat back section so as to be swingable within a horizontal plane, said lower horizontal arms each having, at the distal end portion thereof, lower support means for supporting the hipbone region of a user's body, and wherein each of said lower horizontal arms is fixed in a predetermined angular position by means of first fixing means;
   a pair of upper horizontal arms protruding from the top of the seat back section so as to be swingable within a horizontal plane, said upper horizontal arms each having, at the distal end portion thereof, upper support means for supporting the bladebone regions of the user's body,
   and wherein each of said upper horizontal arms is fixed in a predetermined angular position by means of second fixing means,
   the respective proximal end portions of said lower horizontal arms being transversely movable inside the seat back section, and
   said upper horizontal arms being transversely movable in association with the lower horizontal arms and adjustable in height relative to the lower horizontal arms.

2. The seat according to claim 1, wherein a frontopen slide guide portion is disposed in the lower portion of the inside of the seat back section, and the respective proximal end portions of said pair of lower horizontal arms are pivotally mounted on holders adapted to be transversely guided inside the slide guide portion.

3. The seat according to claim 2, wherein said lower support means includes a lower support frame attached to the distal end portion of each said lower horizontal arm, a slider held by the lower support frame so as to be vertically adjustable in position, a space adjuster attached to the slider, and a bumper attached to the space adjuster.

4. The seat according to claim 3, wherein a shock absorber for damping impulsive compressive force is interposed between said spacer adjuster and said slider.

5. The seat according to claim 4, wherein said space adjuster is an air bag.

6. The seat according to claim 2, which further comprises a base shaft protruding upward from each said holder and a support shaft protruding downward from the proximal end portion of each said upper horizontal arm, and wherein each said upper horizontal arm is urged upward to move away from each corresponding holder, and can be adjusted in height relative to the holder by means of coupling means.

7. The seat according to claim 6, wherein each said upper horizontal arm includes an inner cylinder containing the shock absorber therein, an outer cylinder fitted in the inner cylinder and having a claw to engage a vent plate of the shock absorber, and a space adjuster for adjusting the position of the outer cylinder relative to the inner cylinder.

8. The seat according to claim 7, wherein said upper support means is situated below the outer cylinder.

9. The seat according to claim 8, wherein said upper support means includes an upper support member and a rocker having a bumper attached to the support member.

10. The seat according to claim 9, wherein said space adjuster is composed of the outer cylinder 67 having a female screw at an end portion thereof and a screw member mating with the screw.

11. The seat according to claim 10, wherein each said upper horizontal arm is further provided with head support means.

12. The seat according to claim 1, which further comprises another pair of lower horizontal arms adjoining said pair of lower horizontal arms, one said lower support means being attached to the distal ends of each vertical pair of lower horizontal arms, and wherein each said lower horizontal arm is fixed in a predetermined angular position by means of fixing means.

* * * * *